US000001461H

United States Statutory Invention Registration [19]

[11] Reg. Number: H1461

DiVita et al.

[43] Published: Jul. 4, 1995

[54] ABRASION RESISTANT DIAMOND LIKE COATING FOR OPTICAL FIBER AND METHOD OF FORMING THE COATING

[75] Inventors: Sam DiVita, West Long Branch, N.J.; John L. Margrave, Houston, Tex.; Leif Fredin, The Woodlands, Tex.; Donald E. Patterson, Houston, Tex.

[73] Assignee: The United States of America as represented by the Secretary of the Army, Washington, D.C.

[21] Appl. No.: 59,784

[22] Filed: May 10, 1993

[51] Int. Cl.[6] ..... D02G 3/00
[52] U.S. Cl. ..... 428/375
[58] Field of Search ..... 428/368, 375, 392; 385/123

[56] References Cited

U.S. PATENT DOCUMENTS 4,735,856 4/1988 Schultz et al. ..... 428/368

FOREIGN PATENT DOCUMENTS 243539 9/1990 Japan ..... 385/123
243540 9/1990 Japan ..... 385/123
309306 12/1990 Japan ..... 385/123

*Primary Examiner*—Shean Wu
*Attorney, Agent, or Firm*—Michael Zelenka; Roy E. Gordon

[57] ABSTRACT

A coating is provided for an optical fiber that inhibits abrasion or scratching of the fiber's surface. The coating is obtained by depositing a thin film of non-hydrogenated diamond-like amorphous carbon (a-C) onto the optical fiber using a laser ablation technique employing graphite as a target material.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ABRASION RESISTANT DIAMOND LIKE COATING FOR OPTICAL FIBER AND METHOD OF FORMING THE COATING

GOVERNMENT INTEREST

The invention described herein may be manufactured, used, and licensed by or for the Government for governmental purposes without the payment to us of any royalties thereon.

FIELD OF INVENTION

The invention relates to the art of coating an optical fiber, especially that of providing a coating that inhibits abrasion or scratching of the fiber's surface.

BACKGROUND OF THE INVENTION

Organic coatings are presently used to protect optical fibers from mechanical abrasion that leads to losses and mechanical failure via moisture and stress cracking. These soft coatings must be applied in thicknesses of tens of microns, and the coatings lack dimensional stability and become sticky with age. This causes failures, for example, when spooling the fiber for fiber optic-guided (FOG) missiles. The coatings have excessive volume and weight, limiting the missile range. Recently developed hermetic coatings for fibers provide protection against moisture attack, but do not provide protection against abrasion.

SUMMARY OF THE INVENTION

The general object of this invention is to provide a coating for an optical fiber that will provide abrasion resistance for the fiber as well as act as a chemical barrier for the fiber, with the coating being no greater than 1 micron in thickness. A further object of the invention is to provide such a coating that will provide many applications such as protecting germanium infrared windows from rain erosion and dust abrasion, and protecting magnetic disks from damage due to high speed contact with recording heads. A particular object of the invention is to provide a coated optical fiber wherein the coating provides excellent abrasion protection for electro-optical components such as silicon solar cells.

It has now been found that the foregoing objects can be attained by using diamond like coatings applied at or near room temperature. The coatings are extremely hard and slippery, with microhardness values above 3000 (Vickers) and coefficient of friction values below 0.2 when deposited under proper conditions. They are not attacked or permeated by moisture, brine, or any known acid or alkali at temperature below 100° C.

According to the method of the invention, it is possible to place a thin coating of non-hydrogenated diamond-like amorphous carbon (a-C) directly onto optical fibers with a laser ablation technique using graphite as a target material.

DESCRIPTION OF THE PREFERRED EMBODIMENT

More specifically, the method involves placing the substrate to be coated into an ultra-high vacuum (UHV, typically $10^{-8}$ Torr) chamber. A high intensity laser is then focused on a graphite target in the chamber. Various carbon species from the target are ablated off the target surface and deposited on optical fiber substrates placed in the path of the ablation plume. In this system, the deposited material is a form of a-C with a high $sp^3$ bonded carbon content. An advantage of this method is that the fiber optic substrates do not have to be heated. This a-C coating offers superior adhesion, flexibility, and wear resistance. In fact, on coated pieces of quartz windows, the coating is impossible to remove with abrasive alumina polishing compounds while applying significant force.

In some instances, it may be desirable to coat the conventional optical fiber with a temporary abrasion resistant removable lubricating oil such as silicone oil, grease or benzene prior to spooling the hermetic coated or non hermetic optical fiber. This allows ease of winding or rewinding glass fiber on a spool or drum without breaking prior to applying the permanent abrasion resistant coating on the fiber.

In the method of the invention, the vacuum chamber allows for two or more graphite or graphite-like targets to be ablated with $CO_2$ lasers for example to form a diamond or diamond like abrasion resistant coating on the surface of the fiber that is being drawn at the appropriate speed for complete coverage of the fiber as it is fed through the vacuum system prior to final spooling on the fiber.

Possible uses of the coated optical fibers of the invention include use as optical connectors, heat sinks for a high power optoelectronic device and related circuitry, high tensile strength optical fibers for fish sensing when coupled to fishing gear having a light emitting diode coupled to its fishing lure, abrasion resistant-glass containers for chemicals including household washing fluids, soda, and liquor bottles, coatings for smart skins in aircraft, bullet proof vests, abrasion resistant high strength, impact resistant structural materials, and use in borehole logging operation (that is, of an oil well), where the fiber must function for a useful lifetime under the extreme temperatures on the order of 200° C. and extreme pressures on the order of 20,000 psi that can be encountered in a typical oil well. It is important that inorganic abrasion resistant coating be used for non-hermetic coated fiber as well as hermetic, having appropriate abrasion resistant characteristics.

In lieu of the laser ablation technique disclosed in the description of the preferred embodiment, one might use other diposition methods to coat the optical fiber substrates as for example, a heater filament technique, a direct current discharge, a direct current plasma jet, an RF low pressure, a microwave technique, a flame heated gas technique, etc.

We wish it to be understood that we do not desire to be limited to the exact details of construction shown and described for obvious modifications will occur to a person skilled in the art.

What is claimed is:

1. An optical fiber with a thin inorganic abrasion resistant coating of a non-hydrogenated amorphous carbon that is extremely hard and slippery, with microhardness values above 3000 and coefficient of friction values below 0.2.

* * * * *